United States Patent
Friedmann et al.

(10) Patent No.: US 10,935,990 B2
(45) Date of Patent: Mar. 2, 2021

(54) METHOD FOR THE DRIVERLESS OPERATION OF A VEHICLE SYSTEM DESIGNED FOR THE FULLY AUTOMATIC CONTROL OF A MOTOR VEHICLE, AND MOTOR VEHICLE

(71) Applicant: AUDI AG, Ingolstadt (DE)

(72) Inventors: Felix Friedmann, Eching (DE); Daniel Profendiner, Ingolstadt (DE); Christoph Sippl, Beratzhausen (DE); Florian Netter, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 236 days.

(21) Appl. No.: 15/748,922

(22) PCT Filed: Jul. 15, 2016

(86) PCT No.: PCT/EP2016/001235
§ 371 (c)(1),
(2) Date: Jan. 30, 2018

(87) PCT Pub. No.: WO2017/020993
PCT Pub. Date: Feb. 9, 2017

(65) Prior Publication Data
US 2019/0004546 A1    Jan. 3, 2019

(30) Foreign Application Priority Data

Aug. 4, 2015    (DE) ......................... 102015010178.1

(51) Int. Cl.
*G05D 1/02* (2020.01)
*B60W 40/08* (2012.01)
(Continued)

(52) U.S. Cl.
CPC ............... *G05D 1/12* (2013.01); *B60W 40/08* (2013.01); *G05D 1/0088* (2013.01);
(Continued)

(58) Field of Classification Search
CPC ...... G05D 1/12; G05D 1/0212; G05D 1/0088; G05D 1/0225; G05D 2201/0213; B60W 40/08; B60W 2040/0881; H04W 4/02
See application file for complete search history.

(56) References Cited

U.S. PATENT DOCUMENTS

2010/0063652 A1    3/2010    Anderson
2010/0063680 A1*   3/2010    Tolstedt ............... G05D 1/0214
                                                        701/41
(Continued)

FOREIGN PATENT DOCUMENTS

CN    101750972 A       6/2010
DE    102008036660 A1   5/2009
(Continued)

OTHER PUBLICATIONS

International Preliminary Report on Patentability directed to related International Patent Application No. PCT/EP2016/001235, with attached English-language translation, dated Feb. 6, 2018; 18 pages.

(Continued)

*Primary Examiner* — Peter D Nolan
*Assistant Examiner* — Ashley L Redhead, Jr.
(74) *Attorney, Agent, or Firm* — Sterne, Kessler, Goldstein & Fox P.L.L.C.

(57) ABSTRACT

This disclosure relates to a method for the driverless operation of a vehicle system of a motor vehicle designed for fully automatic control of the motor vehicle. In accordance with at least one sequential criterion, which evaluates a status of the driver, comprising location information describing the current position of the driver and/or comprising resource information describing an amount of a resource that is present or required for the driver, of which resource a supply is present in the motor vehicle, operating information describing the taking of the motor vehicle to a sequential position having a shorter, in particular minimum possible (Continued)

distance from the current position of the driver or from a predicted destination of the driver, is automatically determined and applied. A motor vehicle with an onboard vehicle system and a control device, for execution of the method, are also disclosed.

20 Claims, 2 Drawing Sheets

(51) Int. Cl.
  *G05D 1/00*   (2006.01)
  *G05D 1/12*   (2006.01)
  *H04W 4/02*   (2018.01)

(52) U.S. Cl.
  CPC ......... *G05D 1/0212* (2013.01); *G05D 1/0225* (2013.01); *H04W 4/02* (2013.01); *B60W 2040/0881* (2013.01); *G05D 2201/0213* (2013.01)

(56) References Cited

U.S. PATENT DOCUMENTS

| | | | |
|---|---|---|---|
| 2013/0289801 A1 | 10/2013 | Yoshioka et al. | |
| 2013/0325242 A1* | 12/2013 | Cavender-Bares | A01C 21/002 701/25 |
| 2014/0358382 A1* | 12/2014 | Kou | E21F 17/18 701/50 |
| 2015/0142250 A1* | 5/2015 | Cavender-Bares | A01C 7/004 701/23 |
| 2015/0227882 A1* | 8/2015 | Bhatt | G06Q 10/083 10/83 |
| 2016/0183060 A1* | 6/2016 | Seyde | G06Q 10/04 455/456.3 |

FOREIGN PATENT DOCUMENTS

| | | |
|---|---|---|
| DE | 102008027692 A1 | 12/2009 |
| DE | 102011120991 A1 | 1/2013 |
| DE | 102012014717 A1 | 1/2014 |
| DE | 102013222071 A1 | 4/2015 |
| EP | 2169504 A2 | 3/2010 |
| EP | 2849017 A1 | 3/2015 |
| JP | 2012168602 A | 9/2012 |

OTHER PUBLICATIONS

English-language abstract of German Patent Application Publication No. DE 102008036660 A1, published May 7, 2009; 1 page.
English-language abstract of German Patent Application Publication No. DE 102008027692 A1, published Dec. 17, 2009; 1 page.
English-language abstract of German Patent Application Publication No. DE 102011120991 A1, published Jan. 31, 2013; 1 page.
English-language abstract of German Patent Application Publication No. DE 102012014717 A1, published Jan. 30, 2014; 1 page.
English-language abstract of German Patent Application Publication No. DE 102013222071 A1, published Apr. 30, 2015; 2 pages.
English-language abstract of Japanese Patent Application Publication No. JP 2012168602 A, published Sep. 6, 2012; 1 page.
International Search Report and Written Opinion directed to related International Patent Application No. PCT/EP2016/001235, dated Oct. 17, 2016, with attached English-language translation; 29 pages.
"Autonome Fahrzeuge—Roboterautos als Autos der Zukunft schon heute," Autonomes Fahren & Co., Jul. 17, 2011, with attached English-language translation; 11 pages.
Jagadhambal et al., "Autonomous Self Parking and Self Retrieving Vehicle with GPS Less Keyfob for Vehicle Tracking," International Journal of Science, Engineering and Technology Research, vol. 2, Issue 4, Jan. 2013; pp. 998-1002.

* cited by examiner

METHOD FOR THE DRIVERLESS OPERATION OF A VEHICLE SYSTEM DESIGNED FOR THE FULLY AUTOMATIC CONTROL OF A MOTOR VEHICLE, AND MOTOR VEHICLE

TECHNICAL FIELD

This disclosure relates to a method for the driverless operation of a vehicle system designed for the fully automatic control of a motor vehicle, and to a motor vehicle.

BACKGROUND

In the state of the art, various possible solutions are already known for automatically controlling a motor vehicle that specifically do not require monitoring by the driver, where the motor vehicle operates autonomously. To this end, vehicle systems are deployed that are designed for the fully automatic control of a motor vehicle and that may perform corresponding control interventions on the motor vehicle, such as interventions on the steering wheel longitudinal control, and use/parametrization of other vehicle systems.

One known use of such fully automatic vehicle systems consists in calling the motor vehicle, which has, for example, been parked in a parking space of a parking area, to the current position of the driver. Other proposals also deal with a driverless, autonomous operation of the vehicle system to move the motor vehicle to a predetermined position, possibly at a specific point in time, by an instruction provided by the driver.

Thus, a fundamental, known embodiment of the vehicle system comprises the possibility to determine, by setting a destination location, a route to be followed to the destination, particularly by using a navigation system on the motor vehicle, and to drive the motor vehicle autonomously to the destination position particularly nearest to the destination. When setting a destination by the driver and activating the autonomous movement of the motor vehicle to the destination, the vehicle system generates operating information, which is used with modifications/additions to take into account the current driving conditions.

In this case, the driver has to actively determine when the motor vehicle has to move from one location to the next and then set another destination, which becomes a drawback for the driver as driving conditions change.

BRIEF DESCRIPTION OF THE DRAWINGS/FIGURES

The accompanying drawings are incorporated herein and form a part of the specification.

In the drawings, like reference numbers generally indicate identical or similar elements.

DETAILED DESCRIPTION

Figure 1:
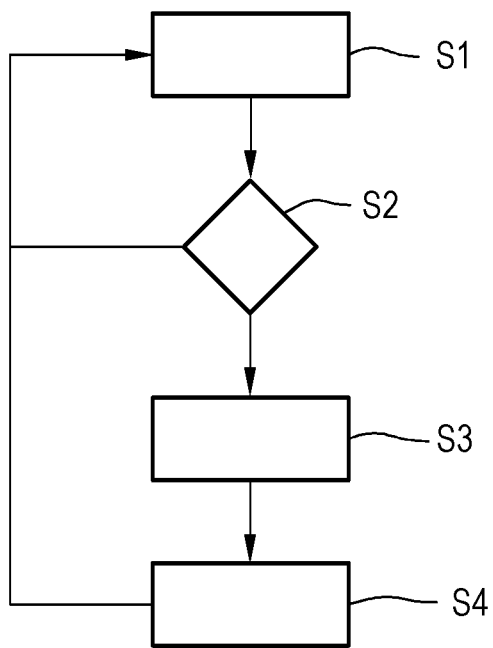
FIG. 1 shows a flow chart of an exemplary embodiment of the disclosed method.

The object of this disclosure is to allow a driverless operation of a motor vehicle that provides a better reaction to current conditions depending on the driver.

To achieve this object, the method disclosed herein automatically determines and applies operating information comprising at least one sequential criterion to take the motor vehicle to a sequential position at a shorter, in particular a minimum, possible distance from the current position of the driver and/or from a predicted destination of the driver. To do this, the method evaluates status information of the driver, comprising location information describing the current position of the driver, and/or comprising resource information describing an amount of a resource that is present with the driver, an amount required by the driver, and/or an amount present as a resource supply in the motor vehicle.

Therefore, according to this disclosure, it is proposed that the driver status is continually tracked and, by using sequential criteria, that it is autonomously decided whether a change of position of the motor vehicle is required or not. If, for example, the current position of the driver is tracked according to the location information, it is conceivable to operate the motor vehicle in such a way that it is always at the minimum possible distance from the current position of the driver, so that the driver always has the shortest route to the motor vehicle. As an alternative, if a sequential criterion is fulfilled, the motor vehicle may also be moved as near as possible to the predicted destination. While on one hand it may be foreseen that an absolute final position of the motion activity of the driver is used as a destination, on the other hand, an intermediate destination may also be used as the destination, where the intermediate destination may correspond to the predicted position of the driver at the time the motor vehicle reaches the sequential position. The use of destinations is particularly preferred in the described embodiments, because when maintaining a short distance from the driver, this short distance is always provided when the sequential position has been reached.

If the motor vehicle is used for transporting resources required by the driver, such as water or work material, the sequential criterion may also be fulfilled when the resources of the driver are dwindling. In this case, the motor vehicle may autonomously move in the vicinity of the driver.

In this way, various advantages are achieved. On one hand, the driver is not required to actively issue an instruction to the motor vehicle whenever the motor vehicle or a resource transported in the motor vehicle is required, because the motor vehicle constantly tracks the activity/movements of the driver. A considerable travel and time reduction is obtained because the driver has to travel a considerably shorter distance to the motor vehicle. Conversely, it is possible to drive the motor vehicle considerably sooner to the current position of the driver by issuing an active instruction. Thus, drivers and motor vehicles can meet sooner, if necessary, and the driver saves time.

Ultimately, the disclosed method achieves predictive autonomous driving. The motor vehicle autonomously tracks the movements/activity of the driver outside the motor vehicle. If the driver decides, for example, to change the route of travel to react to environmental influences (thunderstorms, blocked bicycle paths, and similar conditions), the driver is not required to actively inform the motor vehicle about the route change, because the motor vehicle can react autonomously.

An entirely new aspect of driver assistance is obtained by the predictive supply of resources by the motor vehicle. This lessens the burden on a driver, because the driver is neither required to reach a supply point for the resource, nor to react timely to a resource shortage. Because at least a part of the resources may be transported by the motor vehicle, the driver can access a larger quantity of the resource and/or does not have to transport as many resources by herself. Thus, the driver will carry a lighter load.

An advantageous embodiment provides for a sequential criterion that determines when the distance between the current motor vehicle position and the current driver position exceeds a distance threshold value. The motor vehicle thus maintains a maximum distance to the driver. If an autonomous assistance mode is activated and the driver is moving outside of the motor vehicle, then the vehicle system decides, depending on the motor vehicle's distance to the driver, whether the motor vehicle has to travel in the direction of the driver. The motor vehicle ensures that it is always less than or equal to a maximum distance from the driver, given by the distance threshold value. The motor vehicle autonomously sets itself in motion if the sequential criterion is fulfilled, and then parks near the driver. The driver has thus only to travel a short distance to the motor vehicle. On the other hand, it is possible for the motor vehicle to reach the driver much sooner if it is actively called by the driver, because the motor vehicle is already nearby.

A further preferred and advantageous embodiment of the sequential criterion determines whether a reliability threshold value of the reliability of the determination of a predicted destination is exceeded, where the sequential position is the nearest possible target position to the destination. Using the reliability threshold value, if the vehicle system thus recognizes with acceptable confidence a specific point as a destination for the driver, operating information may be determined in such a way that the motor vehicle arrives near the destination in time and optimizes consumption. This is particularly convenient when the driver moves over a terrain that may be inaccessible to the motor vehicle, for example, when hiking through the wilderness or when performing a sport in which a sport apparatus, such as a paraglider, for traveling through uncharted territory may be used. Moreover, an operation of the vehicle system adapted to the final destination of the driver may be advantageous when using public transportation means that have only particular, well-defined stop positions.

Specifically, a future route of the driver may be predicted to determine the sequential position and/or the destination. In this context, it is particularly convenient if the prediction considers, besides the current position of the driver, a movement history of the driver and/or digital map data, comprising, in particular, points of interest (POI) near the driver, and/or current movement information, particularly comprising the travel speed and the travel direction of the driver, as input data that are at least partially comprised in the status information. The vehicle system thus tracks the movements of the driver, facilitating the prediction of the driver's future route. The movement history may in particular be previously obtained by the vehicle system itself by means of logging location information, such as current positions. In a particularly preferred case, the motor vehicle may also use digital map data, provided with particularly interesting sites (POI) and current movement characteristics, such as speed and direction of the driver. Thus, an excellent reliable prediction at different time scales may be provided.

It is also particularly convenient, when, in the context of the prediction, a transportation means information is used to describe the transportation means used by the driver. The transportation means determines which options the driver is offered regarding the distance still to be traveled. If the driver is walking, for example, walkable paths should be used, whereas if the transportation means is a bicycle, the choice of path is constrained relative to possible bicycle paths. A relative freedom of movement is provided by a flying transportation means, such as a paraglider. While the transportation means information may obviously be defined by a user input, a preferred embodiment provides that the transportation means information is automatically determined by at least a part of the input data. In this case, certain transportation means criteria may be used for differentiating the transportation paths, for example, by criteria such as the paths used and unused, the terrain, the position sequence, and similar differentiating characteristics. For example, a distinction could be made between transportation means such as a bicycle, skis, a boat, a paraglider, and other possible transportation means.

In a particularly preferred embodiment, the sequential criterion used comprises the resource information falling below or exceeding a resource threshold value. If the resource transported by the motor vehicle itself is a resource to be consumed by the driver during his extra-vehicular activity, a sequential criterion is conveniently provided that monitors whether the resource information, i.e., the quantity of the resource carried by the driver, falls below a resource threshold value. Whenever the resources of the driver are decreasing, the motor vehicle will thus position itself near the driver, so that the driver may easily and rapidly pick up new resources from the supply on the motor vehicle. It is, however, also conceivable to use the method when the driver collects the resources, for instance, when picking mushrooms. In this case, the sequential criterion regarding this resource conveniently is the monitoring of the resource information exceeding a resource threshold value, so that the driver is able to reach the nearby motor vehicle to stow at least a portion of the collected resource quantity in the motor vehicle.

In this context, it is particularly advantageous, if, when a refilling criterion describing a resource supply falling below a refilling threshold in the motor vehicle is fulfilled, an operating information is determined and applied, which describes a refilling of the resource by the motor vehicle, particularly by autonomous purchasing at a supply station. The resource supply of the motor vehicle is then sent to and displayed on a mobile device of the driver. Thus, if the resources transported in the motor vehicle are also decreasing, the motor vehicle, if possible, may travel autonomously to a supply station and refill the resource supply (e.g., by autonomous purchase). It is also particularly convenient if the driver can continuously track the resource level in the motor vehicle, in particular on the driver's mobile device, such as a smartphone or a smartwatch.

When the refilling criterion is fulfilled, it is preferred that a driver information indicating the execution of the autonomous refilling process, particularly with a predicted duration of the refilling process, is transmitted to the mobile device. In case of resource scarcity in the motor vehicle, the driver thus receives a corresponding message on the mobile device and is thus also informed about possible related time delays, until the motor vehicle returns.

When collecting resources by the driver, the motor vehicle may provide corresponding services, particularly within the framework of a delivery criterion, by checking whether the supply of resources in the motor vehicle exceeds a delivery threshold. If this is the case, then an operating information can be determined, describing that resources are autonomously transported and delivered to a collection point.

In general, the status information can be at least partially received by a mobile device carried by the driver and/or at least partially determined in the motor vehicle.

To this end, the status information may be determined on the basis of sensor data received through the mobile device of a sensor connected to and/or within the mobile device, and/or on the basis of an input on the mobile device. It may be conceived, for example, that the current position of the driver is tracked by means of a GPS-sensor that is mounted within the mobile device, such as a smartphone. Further movement characteristics of the driver, such as the driver's speed and/or direction, may be obtained, for example, from data of a compass and/or inertial sensor assembly mounted in the mobile device. Sensors mounted in a mobile device may also be useful to provide indications regarding the resource status of the driver if, for example, pattern recognition algorithms are applied on image data and/or audio data.

Furthermore, the mobile device may also be connected to external sensors. For example, the resource information may be determined from operational data received through the driver's mobile device from a utility device connected to the mobile device. External sensors may, for example, be weight sensors and/or volume sensors, which may be positioned on a carried container in which the resource is disposed. Further external sensors may also comprise RFID chips and similar sensors. If the driver uses technical utility devices that are necessarily supplied with resources, or that are used for building up resources, for example, their operational parameters may also be used to determine the resource demand. To connect the mobile device to other apparatus/sensors, preferably wireless communications links may be used, such as Bluetooth connections, Wi-Fi connections, and/or near-field communication (NFC) links. For the communication of the motor vehicle with the mobile device, the preferred wireless communication method is a mobile radio link and/or a connection that operates at least partially over the internet.

Resource information may be determined by the vehicle system based on an activity time interval of the driver since the last known driver-side quantity, and/or based on an activity information derived from and/or contained in the status information that describes the activity of the driver. Resources that are consumed relatively uniformly over time may allow for sufficient determination of the resource information (e.g., especially for more precise prediction) by observing the activity time period of the driver. Particularly preferred, however, is the case in which the resource information is determined by the motor vehicle, using the status information. Thus, information regarding the driver's behavior, i.e., activity information such as the traveled distance and the average resource consumption, may be used to determine the driver's actual resource level.

An advantageous embodiment of the method comprises use of a supply information describing a resource required by the driver as part of the resource information, based on biometric measurement data of the driver, and determined by means of the mobile device. To determine the biometric measurement data, biometric sensors may be used. Such an embodiment is particularly convenient when the driver is involved in exercise or in sport and thus desires a regular liquid and/or nutrient supply. Corresponding nutrients and beverages may be stored within the motor vehicle, which is placed, according to sequential criteria, in a sequential position within reach of the driver. In particular, biometric measurement data may be, for example, the pulse rate, the respiratory rate, the skin conductivity, and similar biometrics. Such sensors are already present on mobile devices, but a person of ordinary skill in the art would understand that these sensors can be connected to the mobile device.

The mobile device may advantageously be a mobile phone, particularly a smartphone. Other kinds of mobile devices may also obviously be used, such as tablets or similar devices. Smartwatches as mobile devices have also proved to be particularly convenient, because they may be easily carried by the driver.

A further advantageous embodiment provides that at least a part of the computations for automatically determining the operating information may be performed on a server device external to the motor vehicle, communicating with a control device of the vehicle system. Thus, it may also be conceived that an external logic is involved for determining when and how the motor vehicle has to move towards the driver. However, it is preferred that the disclosed method is implemented entirely within the motor vehicle, wherein access to external information resources, such as a database of available/free parking spaces and similar data stores, may be provided.

Predictions, such as those required for performing the disclosed method, may be performed by using various generally known algorithms. Known statistical or machine-learning methods may, for example, be used in the prediction. Even special hardware may be used for performing the predictions, such as FPGAs, neuromorphic chips, and similar hardware. As previously mentioned, it is generally conceivable, but less preferred, to calculate predictions also on a motor vehicle external server.

The disclosed method may be advantageously put into practice in a variety of applications. By way of example, the case of a paperboy is initially described. A paperboy carries only a determined number of newspapers and distributes them to corresponding homes. The newspapers may be transported inside a bag, which determines, by means of a weight sensor, how many newspapers are still in the paperboy's bag. If the newspapers, which in this case are considered the resource, decrease in number, then the motor vehicle, which knows about the resource scarcity by means of a resource information transmission from the weight sensor to a mobile device, determines that the sequential criterion is fulfilled. The motor vehicle, in which a large quantity of newspapers is stored, drives near the paperboy to supply the paperboy with more newspapers.

Another exemplary application of the disclosed method is paragliding. A paraglider drives with her motor vehicle to the mountains and starts her flight. The motor vehicle determines, by way of a motion profile, that she is flying and moving at high speed. It immediately sets in motion to meet the paraglider at the predicted destination. When the paraglider changes her trajectory during the flight, the motor vehicle may autonomously react to this change. Similarly, the disclosed method may be used for supplying water and food in the context of other sports, such as in the case of cyclists, runners, and similar athletes.

This disclosure also relates to a motor vehicle, which is provided with a vehicle system configured for a fully automatic control of the motor vehicle, with a control device configured for performing the disclosed method. All provided information regarding the disclosed method may be analogously transferred to the disclosed motor vehicle, for which the already mentioned advantages may also be achieved.

Figure 2:
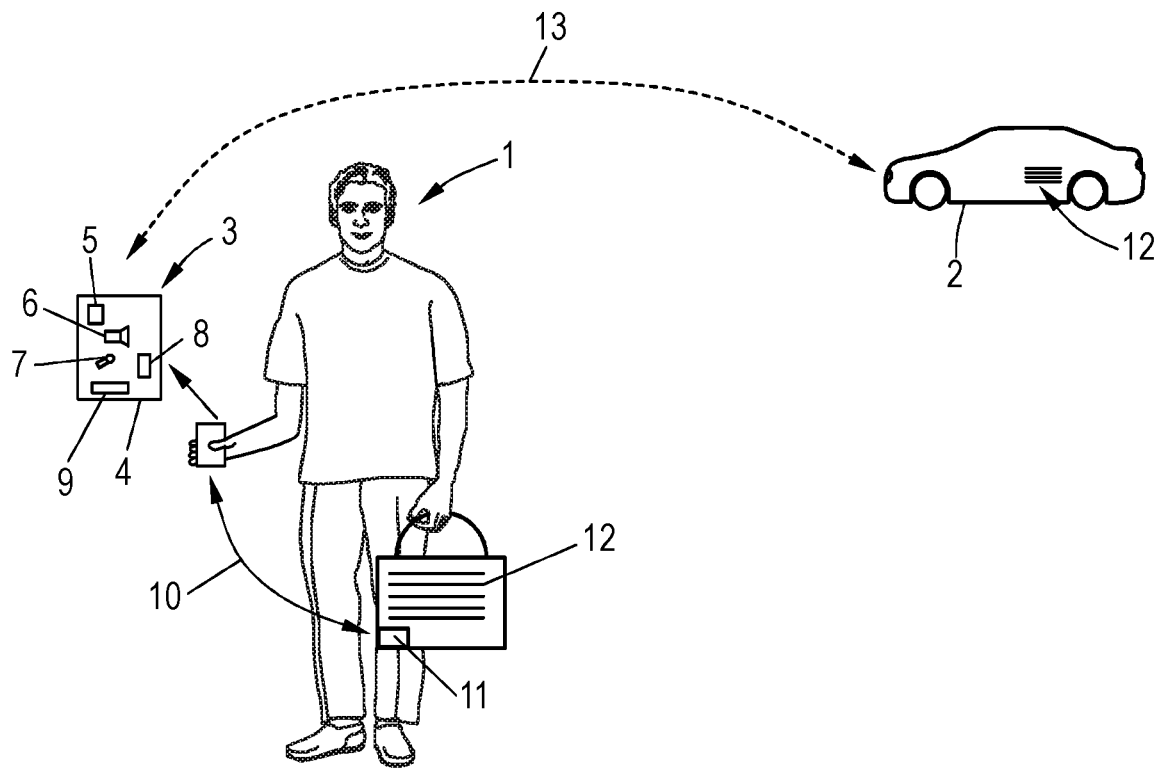
FIG. 2 shows exemplary embodiments of driver-side devices for determining status information.
Figure 3:
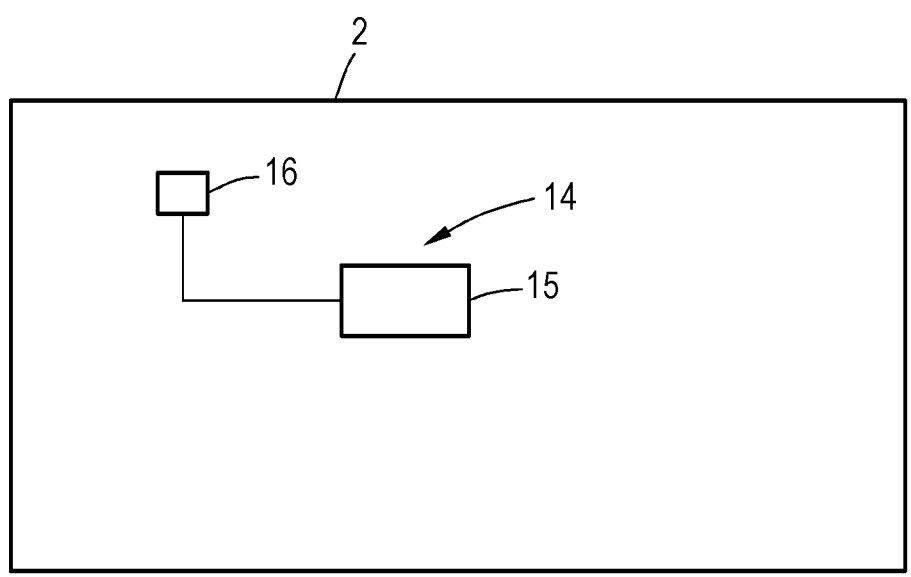
FIG. 3 shows an exemplary embodiment of a motor vehicle implementing the disclosed method.

Further advantages and details of this disclosure may be obtained from the exemplary embodiments described in the following, as well as from the drawings. In particular:

FIG. 1 shows a flow chart of an exemplary embodiment of the disclosed method;

FIG. 2 shows exemplary embodiments of driver-side devices for determining status information; and FIG. 3 shows an exemplary embodiment of a motor vehicle that implements the disclosed method.

FIG. 1 shows a general flow chart of an exemplary embodiment of the disclosed method. The method starts as soon as a driver in a motor vehicle, which is provided with a vehicle system configured for the autonomous control of the motor vehicle, activates an autonomous assistance mode of the vehicle system. This activation may be performed in a parametric way, wherein, in particular, it may be distinguished whether a purely autonomous sequential operation is desired or whether the driver requires transportation assistance regarding an activity that is performed outside the motor vehicle and that requires or generates resources.

In step S1, a status information describing the current situation of the driver is determined. In the case of a purely autonomous tracking, it is sufficient to describe the current position of the driver as a location information and optionally a motion characteristic. When the motor vehicle has to provide assistance for resource transportation, in addition to the current position of the driver (i.e., the location information), a resource information must also be determined, describing a quantity of the resource that is present with the driver, a quantity required by the driver, and the resource supply that is present in the motor vehicle. For determining the status information, a plurality of possibilities exist, which are explained at least in part with reference to FIG. 2.

In FIG. 2, driver 1 is shown, who is currently positioned outside the vehicle 2, which is only schematically shown at a distance. The driver 1 carries a mobile device 3, in this case, a smartphone 4. The smartphone 4 is already capable of determining by itself parts of the status information, such as the location information, because it contains a GPS sensor 5. Further sensors of the smartphone 4, which can detect sensor data for other parts of the status information, are a camera 6, a microphone 7, an inertial sensor assembly 8, and a biometric sensor 9. The inertial sensor assembly 8 allows, for example, for the determination of motion information of driver 1, in particular a current movement speed and current movement direction.

Data of the camera 6 and microphone 7 may provide indications about the resource information by using suitable pattern recognition algorithms and/or image processing algorithms. The biometric sensor 9 provides biometric measurement data of driver 1, which is particularly relevant to a sporting activity, to determine the requirements in terms of beverages and/or food to provide as a resource for driver 1.

The smartphone 4 may also communicate through communication links 10 with other devices, which are part of the status information and/or which may provide data for its determination. Here, a communication with an external sensor 11 takes place, which in this case is a weight sensor in a container that contains newspapers 12 as an example resource.

Collected general components of the status information, and/or sensor data, measurement data, or operating data that are required for determining the status information by the motor vehicle 2, may be transmitted by the mobile device 3 through a communication link 13, in this case a mobile radio link, to the motor vehicle 2.

A component of the current status information may also be a movement history of the driver 1 outside the motor vehicle 2, which may be logged based on current positions (i.e., the location information), and possibly based on the movement information.

Because the status information is known, at step S2 the fulfilment of at least one sequential criterion is checked. The sequential criterion depends, in part, on the specific task of the autonomous assistance mode, which, as previously mentioned, may be selected at its activation. Essentially three application cases have to be distinguished.

The first application case may be defined as a sequential mode. It is independent from any resource and should only be used for ensuring that the motor vehicle 2 is always within a maximum distance around the driver 1, at least when this is reasonable, and when it may be presumed that the driver 1 requires the motor vehicle 2. To this end, two specific embodiments of the sequential criterion may be provided, which may be used cumulatively. On one hand, it may be advantageous to check the sequential criterion to determine whether the distance between the motor vehicle 2 and the driver 1 exceeds a distance threshold value. Such a sequential criterion may ideally be complemented by an exclusion criterion, which checks whether the driver 1 may require the motor vehicle 2 in the current moment or within a determined time window in the future. If the driver 1 is, for example, currently using a public transportation means, it can only be left at defined positions, i.e., stops. A similar case is when the driver 1 operates an aircraft, a boat, or a similar vehicle, because at a determined height or distance from land, the driver 1 could not reach the motor vehicle 2.

A second sequential criterion that may be considered in the sequential mode is the maximum certainty of determining a destination of driver 1, either a final destination or an intermediate destination. To this end, for example, the reliability of the determination of a predicted destination exceeding a reliability threshold may be used. For predicting a destination of driver 1, the status information is advantageously used to predict a future ravel route of driver 1. During the prediction, besides the current position of driver 1, (i.e., the location information), the previously cited movement history of driver 1 and the current movement information of driver 1 are considered. Other useful information to be accessed during the prediction are digital map data, which in particular also contain POI near the driver 1.

The prediction of the destination also makes use of a further information, for example, a transportation means information describing the transportation means used by the driver 1. This information is, in this case, automatically and analytically determined. In particular, the movement history is evaluated in the context of digital map data to determine whether the driver 1 is using an aircraft, for example (i.e., is crossing regions marked as wilderness at high speed), is using a boat (i.e., crossing water), is using a bicycle (i.e., using bicycle paths), or is walking (e.g., on trail paths). Also, more in-depth analysis may be performed that analyzes the movement pattern, the movement speeds, and similar information.

By taking into account the information regarding the transportation means, which may be alternatively determined by input of driver 1, destinations for at least some transportation means may be indicated as more probable, for example, a port in case of a boat, or a glider landing strip in case of a paraglider.

According to the disclosure, the operation based on either final or intermediate destinations is prioritized, particularly the movement time of the motor vehicle 2, so that the motor vehicle 2 is actually near the driver 1 when the driver arrives at the corresponding destination. A sequential criterion, referred to a destination, and a target criterion, referred to a distance threshold, may be considered in combination. Then the motor vehicle 2 is autonomously moved, as soon as the distance threshold is exceeded, and a destination, particularly an intermediate destination, may be indicated with sufficient reliability.

If the driver 1 consumes or requires a resource that is transported by the motor vehicle 2, the case of a resource information falling below a resource threshold can also be used as a sequential criterion. However, if the driver 1 collects a resource, for example, when collecting mushrooms, the exceeding of a resource threshold by the resource information can also be used as a sequential criterion. If the driver 1 carries, for example, newspapers, whether he still has enough newspapers with him can be monitored, for example, by means of the sensor 11. If the newspapers are running low, the sequential criterion can be fulfilled, and the motor vehicle 2 moves to the driver 1, as will be described below. If the driver 1 is currently participating in a sporting activity, the required resource can comprise beverages or food, which, for example, can be derived from the previously mentioned biometric measurement data, but also from the past activity history of the driver 1. Then the motor vehicle 2 can therefore drive to the driver 1 so that the driver 1 can eat and/or drink. Of course, a person of ordinary skill in the art could envision a variety of other examples in which a driver 1 requires, consumes, and/or obtains certain resources during an activity outside the motor vehicle 2, such that the motor vehicle 2 can support their transportation in an extremely useful and autonomous way.

If a sequential criterion (or a predefined combination of sequential criteria) is met, operating information is determined at step S3, which is suitable for autonomously driving the motor vehicle 2 to a sequential position. In a less preferred embodiment, the sequential criterion is determined so that the shortest possible distance to the current position of the driver 1 is given. Preferably, however, the sequential criterion refers to the destination, which, as previously mentioned, can also be an intermediate destination. The sequential position is then selected so that the distance between the sequential position and the destination is as small as possible. In this case, use is made of possible methods for autonomous trip planning, as known in the art, whereby external resources can also be used, for example, databases containing free parking spaces, and the like. At step S4, the operating information is then implemented accordingly. The driver 1 then has the shortest possible distance to travel to the motor vehicle 2 if the driver wants to use it again for driving, picking up resources, unloading, or similar activities.

Another functionality of the disclosed method, which is not shown in detail in FIG. 1 for the sake of clarity, refers to the constant monitoring of the fulfillment of a refill criterion when the motor vehicle 2 has to provide resources 12 required and/or consumed by the driver 1. The refill criterion monitors whether the resource supply in the motor vehicle 2 falls below a refill threshold value. If this is the case, i.e., if additional resources 12 are required in the motor vehicle 2, an operating information is determined which describes a route of the motor vehicle 2 to a supply station for the resource 12 and an autonomous refilling, such as an autonomous purchasing. If such a refill trip is carried out, a corresponding message, which also contains a predicted duration of the refilling process, is transmitted to the mobile device 3 of the driver 1. In addition, in one embodiment in which the motor vehicle 2 is to transport and deliver required and/or used resources 12, it is advantageous to always transmit the current resource supply of the motor vehicle 2 for display to the mobile device 3.

An analogous procedure is also conceivable if the driver 1 collects resources 12, because then, as soon as a supply threshold of a supply criterion is fulfilled that, for example, describes the available storage space in the motor vehicle 2, it is foreseen that additional motor vehicles 2 are autonomously operated for the delivery of resources 12 to create space for newly obtained resources 12 by the driver 1.

Finally, FIG. 3 shows a schematic diagram of a motor vehicle 2. As already described, this comprises the vehicle system 14 configured for fully automatic, or autonomous, control of the motor vehicle 2. The vehicle system 14 comprises a control device 15 that is configured to perform the disclosed method. The communication link 13 with the mobile device 3 may be established by means of a communication device 16.

The invention claimed is:

1. A method for driverless operation of a vehicle system of a motor vehicle designed for fully automatic control of the motor vehicle, comprising:
    evaluating, by a control device, a status information of a driver, based on at least one sequential criterion, wherein the at least one sequential criterion comprises location information describing a current position of the driver, wherein the driver is outside the motor vehicle;
    receiving, from the driver, sensor data of a resource carried by the driver;
    evaluating, by the control device, resource information, based on the sensor data and the at least one sequential criterion, wherein the at least one sequential criterion comprises an amount of the resource that is present or required for the driver, and wherein a supply of the resource is present in the motor vehicle;
    determining, by the control device, that the at least one sequential criterion is fulfilled;
    determining, by the control device, an operating information describing transporting the motor vehicle to a sequential position having a shorter distance from the current position of the driver or from a predicted destination of the driver; and
    in response to determining that the at least one sequential criterion is fulfilled, applying, by the control device, the operating information to transport the motor vehicle automatically to the sequential position where the driver picks up the resource from the motor vehicle.

2. The method of claim 1, wherein the at least one sequential criterion is a distance between a current position of the motor vehicle and the current position of the driver exceeding a distance threshold value.

3. The method of claim 1, wherein the at least one sequential criterion is a reliability of a determination of the predicted destination exceeding a reliability threshold value, wherein the sequential position used is a nearer target position to the predicted destination.

4. The method of claim 1, further comprising:
    predicting, by the control device, a future distance travelled by the driver from the current position of the driver; and
    determining, by the control device, the sequential position or the predicted destination of the driver from the future distance travelled.

5. The method of claim 4, wherein the predicting of the future distance travelled takes into account a movement history of the driver, digital map data comprising points of interest near the driver, or a current movement information comprising a travel speed and a travel direction of the driver, as input data which are at least partially contained in the status information.

6. The method of claim 1, wherein the at least one sequential criterion is a quantity of the resource carried by the driver falling below a threshold value.

7. The method of claim 1, further comprising:
determining, by the control device, when a refilling criterion describing the resource supply falling below a refilling threshold in the motor vehicle is fulfilled, the operating information describing a refilling of the resource by the motor vehicle; and
applying, by the control device, the operating information to refill the resource by the motor vehicle.

8. The method of claim 1, wherein the status information is at least partially received by a mobile device carried by the driver or is at least partially determined in the motor vehicle.

9. The method of claim 8, wherein the status information is determined from sensor data received through the mobile device of a sensor connected to or contained within the mobile device, or is determined based on an input on the mobile device.

10. The method of claim 1, wherein at least a portion of computations for automatically determining the operating information may be performed on a server device, external to the motor vehicle, communicating with the control device of the vehicle system.

11. A motor vehicle, having a vehicle system configured for fully automatic control of the motor vehicle, having a control device configured to:
evaluate, a status information of a driver, based on at least one sequential criterion, wherein the at least one sequential criterion comprises location information describing a current position of the driver, wherein the driver is outside the motor vehicle;
receive, from the driver, sensor data of a resource carried by the driver;
evaluate, resource information, based on the sensor data and the at least one sequential criterion, wherein the at least one sequential criterion comprises an amount of the resource that is present or required for the driver, and wherein a supply of the resource is present in the motor vehicle;
determine that the at least one sequential criterion is fulfilled;
determine an operating information describing transporting the motor vehicle to a sequential position having a shorter distance from the current position of the driver or from a predicted destination of the driver; and
in response to determining that the at least one sequential criterion is fulfilled, apply the operating information to transport the motor vehicle automatically to the sequential position where the driver picks up the resource from the motor vehicle.

12. The motor vehicle of claim 11, wherein the at least one sequential criterion is a distance between a current position of the motor vehicle and the current position of the driver exceeding a distance threshold value.

13. The motor vehicle of claim 11, wherein the at least one sequential criterion is a reliability of a determination of the predicted destination exceeding a reliability threshold value, wherein the sequential position used is a nearer target position to the predicted destination.

14. The motor vehicle of claim 11, wherein the control device is further configured to:
predict a future distance travelled by the driver from the current position of the driver; and
determine the sequential position or the predicted destination of the driver from the future distance travelled.

15. The motor vehicle of claim 14, wherein to predict the future distance travelled, the control device is configured to take into account a movement history of the driver, digital map data comprising points of interest near the driver, or a current movement information comprising a travel speed and a travel direction of the driver, as input data which are at least partially contained in the status information.

16. The motor vehicle of claim 14, wherein to predict the future distance travelled, the control device is configured to take into account a transportation approach information describing a transportation approach used by the driver.

17. The motor vehicle of claim 11, wherein the at least one sequential criterion is a quantity of the resource carried by the driver falling below a resource threshold value.

18. The motor vehicle of claim 11, wherein the control device is further configured to:
determine when a refilling criterion describing the resource supply falling below a refilling threshold in the motor vehicle is fulfilled, the operating information describing a refilling of the resource by the motor vehicle; and
apply the operating information to refill the resource by the motor vehicle.

19. The motor vehicle of claim 18, wherein the control device is configured to transmit a status of the resource supply to a mobile device for displaying the refilling of the resource by the motor vehicle.

20. The motor vehicle of claim 11, wherein the control device is configured to at least partially determine the status information in the motor vehicle.

* * * * *